(12) United States Patent
Senf, Jr. et al.

(10) Patent No.: US 9,908,452 B2
(45) Date of Patent: Mar. 6, 2018

(54) CLOSED LOOP CAPACITY AND POWER MANAGEMENT SCHEME FOR MULTI STAGE TRANSPORT REFRIGERATION SYSTEM

(71) Applicant: Carrier Corporation, Farmington, CT (US)

(72) Inventors: Raymond L. Senf, Jr., Central Square, NY (US); Michael Stockbridge, Canastota, NY (US); John R. Reason, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 670 days.

(21) Appl. No.: 14/370,998

(22) PCT Filed: Mar. 6, 2013

(86) PCT No.: PCT/US2013/029260
§ 371 (c)(1),
(2) Date: Jul. 8, 2014

(87) PCT Pub. No.: WO2013/134337
PCT Pub. Date: Sep. 12, 2013

(65) Prior Publication Data
US 2015/0013361 A1    Jan. 15, 2015

Related U.S. Application Data

(60) Provisional application No. 61/608,968, filed on Mar. 9, 2012.

(51) Int. Cl.
*F25B 43/02*     (2006.01)
*F25B 1/00*      (2006.01)
(Continued)

(52) U.S. Cl.
CPC .............. *B60P 3/20* (2013.01); *B60H 1/3208* (2013.01); *B60H 1/3222* (2013.01);
(Continued)

(58) Field of Classification Search
CPC ....... B60H 1/3208; B60H 1/3232; B60P 3/20; F25B 2600/2509; F25B 49/022; F25D 29/003
See application file for complete search history.

(56) References Cited

U.S. PATENT DOCUMENTS 4,831,830 A     5/1989  Swenson
5,163,399 A    11/1992  Bolander et al.
(Continued)

FOREIGN PATENT DOCUMENTS

CN    101681177 A     3/2010
DE     10200637 C1   10/2003
(Continued)

OTHER PUBLICATIONS

Chinese Office Action and Search Report for application CN 201380007116.1, dated Feb. 3, 2016, 7 pages.
(Continued)

*Primary Examiner* — Henry Crenshaw
(74) *Attorney, Agent, or Firm* — Cantor Colburn LLP

(57) ABSTRACT

A unit, such as a transport refrigeration unit 12, may include a plurality of components arranged in multiple stages. At least a portion of the components 18,20 may be arranged in a serial or parallel manner. A position associated with the plurality of components may be selected to control a load on a power source, such as an engine 30. For example, a position for each of the components may be selected so as to maximize a delivery of available power from the power source to the unit. In some embodiments, one or more controllers 32,34 may measure a parameter associated with (Continued)

the power source and select a position for one or more of the components. In some embodiments, an economized refrigeration cycle may be used. Capacity may be staged from a single stage compression cycle or mode to a multistage compression cycle or mode, with a corresponding increase in capacity via subcooling.

8 Claims, 4 Drawing Sheets

(51) Int. Cl.
    *F25D 29/00*     (2006.01)
    *F25B 41/00*     (2006.01)
    *F25B 41/04*     (2006.01)
    *F25B 49/00*     (2006.01)
    *B60P 3/20*     (2006.01)
    *B60H 1/32*     (2006.01)
    *F25B 49/02*     (2006.01)
    *F25B 1/10*     (2006.01)

(52) U.S. Cl.
    CPC ......... *B60H 1/3232* (2013.01); *F25B 49/022* (2013.01); *F25D 29/003* (2013.01); *F25B 1/10* (2013.01); *F25B 41/043* (2013.01); *F25B 2327/001* (2013.01); *F25B 2400/13* (2013.01); *F25B 2600/0253* (2013.01); *F25B 2600/2509* (2013.01)

(56) References Cited

U.S. PATENT DOCUMENTS

| | | | |
|---|---|---|---|
| 5,228,301 A * | 7/1993 | Sjoholm | B60H 1/00007 165/263 |
| 5,456,088 A | 10/1995 | Hanson et al. | |
| 5,669,225 A | 9/1997 | Beaverson et al. | |
| 5,798,577 A | 8/1998 | Lesesky et al. | |
| 6,044,651 A * | 4/2000 | Reason | B60H 1/3208 62/158 |
| 6,047,556 A * | 4/2000 | Lifson | F25B 40/02 251/129.05 |
| 6,141,981 A | 11/2000 | Reason et al. | |
| 6,148,627 A | 11/2000 | Reason et al. | |
| 6,196,012 B1 * | 3/2001 | Reason | B60H 1/3204 62/196.2 |
| 6,226,998 B1 | 5/2001 | Reason et al. | |
| 6,318,100 B1 | 11/2001 | Brendel et al. | |
| 6,487,869 B1 | 12/2002 | Sulc et al. | |
| 6,543,242 B2 | 4/2003 | Reason et al. | |
| 7,266,961 B2 | 9/2007 | Ludwig et al. | |
| 2002/0100285 A1 | 8/2002 | Baruschke et al. | |
| 2003/0110785 A1 * | 6/2003 | Williamson | F25B 49/02 62/149 |
| 2004/0065100 A1 * | 4/2004 | Jacobsen | B60H 1/3232 62/228.1 |
| 2006/0010907 A1 * | 1/2006 | Taras | F24F 3/153 62/513 |
| 2006/0053811 A1 | 3/2006 | Lifson et al. | |
| 2008/0229767 A1 | 9/2008 | Nakamura et al. | |
| 2010/0064703 A1 * | 3/2010 | Senf, Jr. | F25B 49/025 62/115 |
| 2010/0068084 A1 * | 3/2010 | Lifson | F04B 49/22 417/505 |
| 2010/0199712 A1 * | 8/2010 | Lifson | F25B 41/04 62/498 |
| 2010/0212337 A1 | 8/2010 | Taras et al. | |
| 2010/0236264 A1 * | 9/2010 | Lifson | F25B 49/005 62/115 |
| 2014/0144164 A1 * | 5/2014 | Steele | B60H 1/00364 62/115 |

FOREIGN PATENT DOCUMENTS

| | | |
|---|---|---|
| RU | 2320500 C2 | 3/2008 |
| WO | 02090844 A1 | 11/2002 |

OTHER PUBLICATIONS

Russian Office Action for application RU 2014128299/11, dated Mar. 13, 2017, 6pgs.
PCT International Search Report and the Written Opinion of the International Searching Authority, or the Declaration and Written Opinion of the International Searching Authority for International Application No. PCT/US2013/029260, dated Jun. 5, 2013, 13 pgs.

* cited by examiner

CLOSED LOOP CAPACITY AND POWER MANAGEMENT SCHEME FOR MULTI STAGE TRANSPORT REFRIGERATION SYSTEM

BACKGROUND

Refrigeration systems/units are frequently used in connection with the transport of goods, such as perishable food products. The mobile nature of the transport frequently presents challenges, as power sources are limited. For example, an engine that may be used to power the refrigeration unit is of a finite size, or in other words, the engine has a finite capacity.

The evolution of transport refrigeration units, at least with respect to capacity and efficiency, frequently require the system to utilize 100% of available power. When a refrigeration unit includes a multi stage compression cycle, this can lead to difficult and unstable power management. For example, in a transport system using a small engine (e.g., an engine of a relatively small capacity), there might not be an available engine power reserve between the refrigeration unit and the engine. In this regard, if a higher stage of the multi stage compression cycle is too aggressively engaged, the engine could be subjected to a high probability of stalling. On the other hand, if a higher stage of the multi stage compression cycle is passively engaged (e.g., the higher stage is engaged later than it otherwise could have been), this may result in an under-utilization of the available engine power by the refrigeration unit.

In traditional systems, an added power demand of a higher stage or economized cycle may cause a suction throttling event in response to power overload. Suction throttling for midstage injection flow is inefficient and troublesome.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to aspects of the disclosure, engine power that is available may be supplied to one or more stages of a refrigeration unit. In some embodiments, one or more parameters associated with engine performance may be monitored or measured. Based on the measurement of the one or more parameters, power supplied to the one or more stages of the refrigeration unit may be selectively controlled.

In some embodiments, a controller may monitor or measure one or more parameters associated with engine performance, such as actual or real-time engine performance. When the one or more parameters indicate a decline in engine performance beyond a threshold, the controller may be configured to throttle refrigeration power associated with one or more stages.

In some embodiments, a multi stage compression cycle associated with a refrigeration unit may be configured in a serial fashion. For example, operation of a refrigeration unit may transition from a single stage to a higher stage responsive to determining that one or more parameters associated with engine performance indicates that there is not any error in connection with single stage operation. In some embodiments, serializing power management between the two stages may help to smooth a performance profile of the system (e.g., the engine).

In some embodiments, a multi stage compression cycle associated with a refrigeration unit may be configured in a parallel fashion. The stages may independently control the system power in parallel, potentially using different control values. For example, a first stage may be more tolerant of variation in engine performance (e.g., may allow for a higher speed error) relative to a second or higher stage. In this regard, the first stage may serve as a back-up control mechanism if the second or higher stage is unable to control the system to its lower speed error.

Other aspects of the disclosure are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
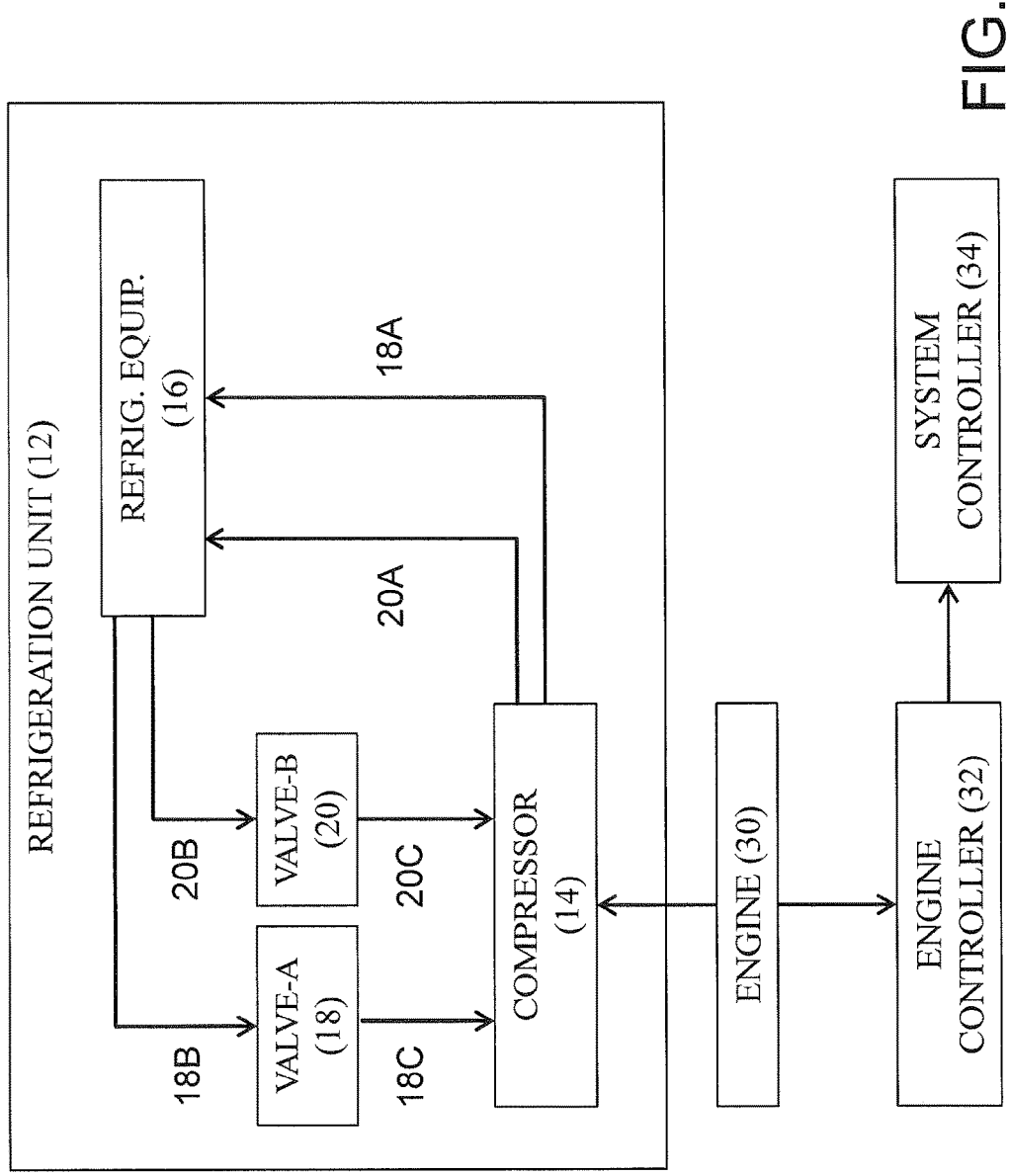
FIG. 1A illustrates an exemplary system in accordance with one or more aspects of this disclosure.

In accordance with various aspects of the disclosure, power supplied or delivered to a unit, such as a multi stage transport refrigeration unit, may be maximized while simultaneously mitigating or eliminating error associated with a power source (e.g., engine error). In the examples described below, a refrigeration unit having a two-stage compression cycle is described. A skilled artisan would appreciate, based on a review of this disclosure, that higher order compression cycles (e.g., more than two compression cycles) may be used in some embodiments.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

FIG. 1A illustrates a block diagram of a system 10 in accordance with one or more aspects of this disclosure. In some embodiments, one or more of the components, devices, or apparatuses of FIG. 1A may be used in connection with a refrigeration of goods, such as perishable food products, medical or laboratory materials, etc.

System 10 may include a refrigeration unit 12. Refrigeration unit 12 may be used to keep goods at an appropriate temperature. For example, refrigeration unit 12 may be used to keep goods at an appropriate temperature while the goods are in transit.

Refrigeration unit 12 may include a compressor 14. When refrigeration unit 12 is operating in a cooling mode, low temperature, low pressure refrigerant vapor may be compressed by compressor 14 to high pressure, high temperature refrigerant vapor. The high pressure, high temperature refrigerant vapor may be passed or provided to one or more pieces of refrigeration equipment 16 by compressor 14. Refrigeration equipment 16 may include one or more pieces of equipment configured to process refrigerant as known to those of skill in the art. For example, refrigeration equipment may include one or more heat exchangers (e.g., condenser heat exchangers, evaporator heat exchangers, refrigerant-to-refrigerant heat exchanger), economizer circuit, coils (e.g., subcooler coils), receivers, expansion devices (e.g., electronic expansion valves, mechanical thermostatic expansion valves), etc. The processed refrigerant generated by refrigeration equipment 16 may be provided to compressor 14, potentially via one or more devices, such as valve-A 18 and valve-B 20 shown in FIG. 1A.

Figure 1B:
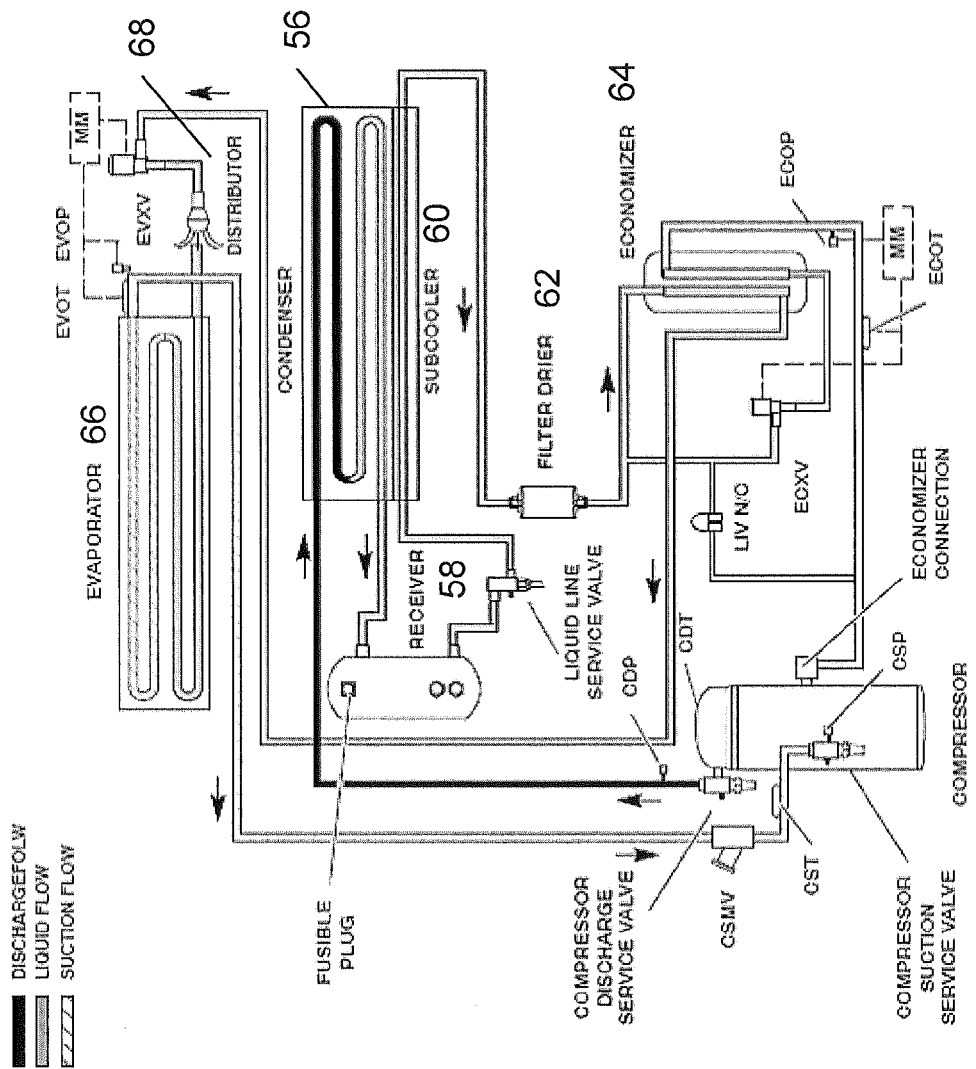
FIG. 1B illustrates an exemplary schematic of a refrigeration system in accordance with one or more aspects of this disclosure.

FIG. 1B illustrates an exemplary schematic of a refrigeration system in accordance with one or more aspects of this disclosure. In some embodiments, one or more of the components or devices shown in FIG. 1B may be associated with one or more of the blocks shown in FIG. 1A. In some embodiments, one or more stages of the refrigeration system (or components associated therewith) of FIG. 1B may be turned on or off to impact capacity. In some embodiments, one or more components or devices may operate and/or communicate via different pressures dictated by, e.g., a compressor. In some embodiments, a first stage may dictate or influence evaporator mass flow, and a second stage may dictate or influence a subcooling potential to an evaporator.

As shown via the directional arrows in FIG. 1B, refrigerant vapor may be passed from an outlet of compressor 54 to a condenser heat exchanger 56. Condenser 56 may condense the refrigerant vapor to a liquid. The liquid may be passed from condenser 56 to a receiver 58. Receiver 58 may provide storage for excess liquid refrigerant. From receiver 58, the liquid may be passed through a subcooler coil 60 of condenser 56, and through a filter drier 62 to an economizer 64. From economizer 64, the liquid may be passed to an evaporator 66, by way of one or more distributors 68. In evaporator 66, the liquid refrigerant may be evaporated, and may be superheated. Refrigerant vapor may be provided from evaporator 66 to compressor 54.

Referring back to FIG. 1A, compressor 14 may receive power from one or more sources. For example, in a transport or mobile application, compressor 14 may receive power from an engine 30. Engine 30 may be associated with an automobile (e.g., a truck), an airplane, a boat or other marine craft, a train, or any other type of vehicle. While a single engine 30 is shown in FIG. 1A, in some embodiments more than one engine 30 may be used. In some embodiments, engine 30 may be or include a diesel engine.

In some embodiments, a compressing mechanism of compressor 14 may include a shaft driven by a drive shaft of engine 30. Compressor 14's shaft may be directly, mechanically coupled to the drive shaft of engine 30, or through a belt drive.

In some embodiments, engine 30 might not directly provide power to compressor 14. For example, engine 30 may drive an electric generator (not shown), and the electric generator may supply electrical power to a motor of compressor 14 (not shown). The motor of compressor 14 may drive the compression mechanism of compressor 14.

System 10 may include one or more engine controllers. An engine controller 32 may be configured to measure or monitor one or more parameters associated with a performance of engine 30. For example, engine controller 32 may monitor engine 30 for an overload condition (e.g., where the output of engine 30 meets or exceeds capacity, or is approaching an output capacity within a threshold value).

Such an overload condition may be specified in accordance with one or more terms. For example, an operating speed of engine 30 may be measured by engine controller 32 in units of revolutions per minute (RPM) (or in accordance with some other unit of speed), expressed as a percent of a target engine RPM. The operating speed of engine 30 may provide an indication of engine RPM droop, which may serve as an indication of the drop-off in the actual or real-time operating engine RPM relative to the target engine RPM.

In some embodiments, engine controller 34 may measure or sense a position of a mechanical fuel rack or an associated sensor, which may represent a fuel throttle position, and may be indicative of a level of fuel flow being supplied to engine 30 relative to a maximum permissible fuel flow. The relationship between the level of fuel flow being supplied to engine 30 relative to the maximum permissible fuel flow may serve as a proxy or indication of (actual) operating engine load relative to the maximum operating engine load.

Engine controller 32 may transmit measurements or parameters relating to the operation of engine 30 to a system controller 34. System controller 34 may be configured to compare the measurements/parameters to one or more thresholds or tolerances. If the thresholds or tolerances are not being exceeded (e.g., engine 30 is not being subjected to an overload condition), system controller 34 might not impose any restrictions on the operation of refrigeration unit 12. For example, system controller 34 may allow refrigeration unit 12 to fully utilize any input power received from engine 30. On the other hand, if one or more of the thresholds or tolerances are exceeded (e.g., engine 30 is being subjected to an overload condition), system controller 34 may intervene in order to mitigate or eliminate the load on engine 30 by reducing compressor 14's operating capacity. The adaptation of compressor 14's operating capacity is described further below.

While shown in FIG. 1A as separate entities, in some embodiments engine controller 32 and system controller 34 may be located within a common casing or housing. In some embodiments, a first portion of a controller (e.g., controllers 32 and 34) may be located in a first device, and one or more additional portions of the controller may be located in one or more other devices.

In some embodiments, an apparatus or system (e.g., system 10) may include one or more processors, and memory storing instructions that, when executed by the one or more processors, cause the apparatus or system to perform one or more methodological acts as described herein. For example, engine controller 32 and/or system controller 34 may include one or more processors, memory, and/or input/output (I/O) interfaces for causing one or more actions to be performed as described herein. In some embodiments, instructions may be stored on one or more computer-readable media, such as a transitory and/or non-transitory computer-readable medium. The instructions, when executed, may cause an entity (e.g., engine controller 32 and/or system controller 34) to cause one or more actions to be performed as described herein.

Compressor 14 may receive (processed) refrigerant from refrigeration equipment 16 via one or more devices, such as valve-A 18 and valve-B 20. Compressor 14, refrigeration equipment 16, and valve 18 may be coupled to one another via channels 18A, 18B, and 18C as shown in FIG. 1A. Compressor 14, refrigeration equipment 16, and valve 20 may be coupled to one another via channels 20A, 20B, and 20C. Channels 18A-18C and/or 20A-20C may provide for a communication of one or more substances, such as a refrigerant.

Valves 18 and 20 may be used to selectively provide input to compressor 14. For example, when valve 18 is open, refrigerant may be supplied to compressor 14 via channel

18C. Conversely, when valve 18 is closed, no refrigerant may be provided to compressor 14 via channel 18C (with the possible exception of any leakage through valve 18). When valve 20 is open, refrigerant may be supplied to compressor 14 via channel 20C. Conversely, when valve 20 is closed, no refrigerant may be provided to compressor 14 via channel 20C (with the possible exception of any leakage through valve 20).

While compressor 14 is shown as having two output channels 18A and 20A in FIG. 1A, in some embodiments compressor 14 may have more or less than two output channels. For example, compressor 14 may have only one leaving refrigerant flow path. Channels 18C and 20C may be compounded within compressor 14 to a single outlet channel. In a single stage mode, there may be one inlet or input stream or channel (e.g., 18C) and one outlet or output stream or channel (e.g., 18A). In a two-stage or compound mode, two inlet or input streams or channels (e.g., 18C and 20C), at potentially different pressures may be compounded to a single outlet flow stream or channel.

In some embodiments, the extent to which a valve may be open may be varied. For example, valves 18 and 20 may be closed, fully opened, or only partially opened at any given point in time. The state of a valve may be changed and may be controlled by, e.g., system controller 34. For example, based on a load or condition associated with engine 30, system controller 34 may be configured to selectively open or close one or both of valves 18 and 20. In some embodiments, system controller 34 may store data indicative of a percentage of maximum engine load. For example, system controller 34 may store data indicative of a level of fuel flow, RPM (droop), or temperature. System controller 34 may compare the stored data to actual or measured values provided by engine controller 32. When the actual or measured values exceed the stored data, system controller 34 may begin to close (or completely shut) one or both of valves 18 and 20. In this manner, system controller 34 may control the load refrigeration unit 12 imposes on engine 30 by selectively allowing or restricting a flow of refrigerant to compressor 14.

Having described controlling the load refrigeration unit 12 imposes on engine 30 by way of controlling the extent to which valves 18 and 20 are open, description is provided below regarding the configuration of valves 18 and 20, in potential combination with channels 18A-18C and 20A-20C, respectively.

In some embodiments, valves 18 and 20 may be representative of a multi or dual stage compression cycle. For example, valve 18 may be associated with a first stage of a compression cycle, and valve 20 may be associated with a second stage of the compression cycle. Valve 18 may be associated with a suction modulation valve (SMV). Valve 20 may be associated with an economizer expansion valve (EEV) valve.

In terms of whether one or both of the first and second stages should be "on," "energized," or "engaged" (and to what extent) may be a function of the (maximum) capacity of engine 30, as well as the actual load experienced by engine 30 at a particular point in time. The actual load experienced by engine 30 could vary based on any number of input conditions, such as environmental effects (e.g., thermal conditions, vibration, pressure, altitude, etc.), the number of other units or devices receiving power from engine 30, etc.

In some embodiments, the first stage and the second stage compression cycles may be operated in a serial manner or fashion. Such a serial operation is exemplified in the method of FIG. 2. For ease of illustration, the method is described in connection with system 10 of FIG. 1A described above. The method shown in FIG. 2 may be adapted to accommodate different systems or architectures.

In step 202, refrigeration unit 12 may be started in a standard mode. For example, SMV 18 may be partially open and EEV 20 may be closed to start. The standard mode of step 202 may entail any combination of positions or states for SMV 18 and/or EEV 20. From step 202, flow may proceed to step 204.

Step 204 may be indicative of one or more actions taken in response to an error, such as a temperature error detected by an SMV proportional-integral-derivative (PID) controller. In some embodiments, SMV PID controller may include one or more components, and may perform one or more functions, as described above in connection with controllers 32 and 34. From step 204, flow may proceed to step 206.

In step 206, a determination may be made whether the SMV position is inducing an error condition, such as an engine speed error. If the SMV position is inducing engine speed error, then flow may proceed from step 206 to step 210. If the SMV position is not inducing engine speed error, then flow may proceed from step 206 to step 208.

In step 208, a determination may be made whether SMV 18 is at a maximum opening (e.g., fully open). If SMV 18 is maximally opened, flow may proceed from step 208 to step 254. In some embodiments, the flow from step 208 to step 254 may also be conditioned on another indication or determination that there is not any engine speed error (e.g., the engine speed error has a value of '0'). If, in step 208 a determination is made that SMV 18 is not maximally opened, flow may proceed from step 208 to step 204. As part of the flow from step 208 to step 204, the extent to which SMV 18 is open may be incremented. Incrementing SMV 18 may serve to maximize the power being consumed or utilized by refrigeration unit 12.

Step 210 may be indicative of one or more actions taken in response to an error, such as an engine speed error as detected in step 206. From step 210, flow may proceed to step 212.

Figure 2:
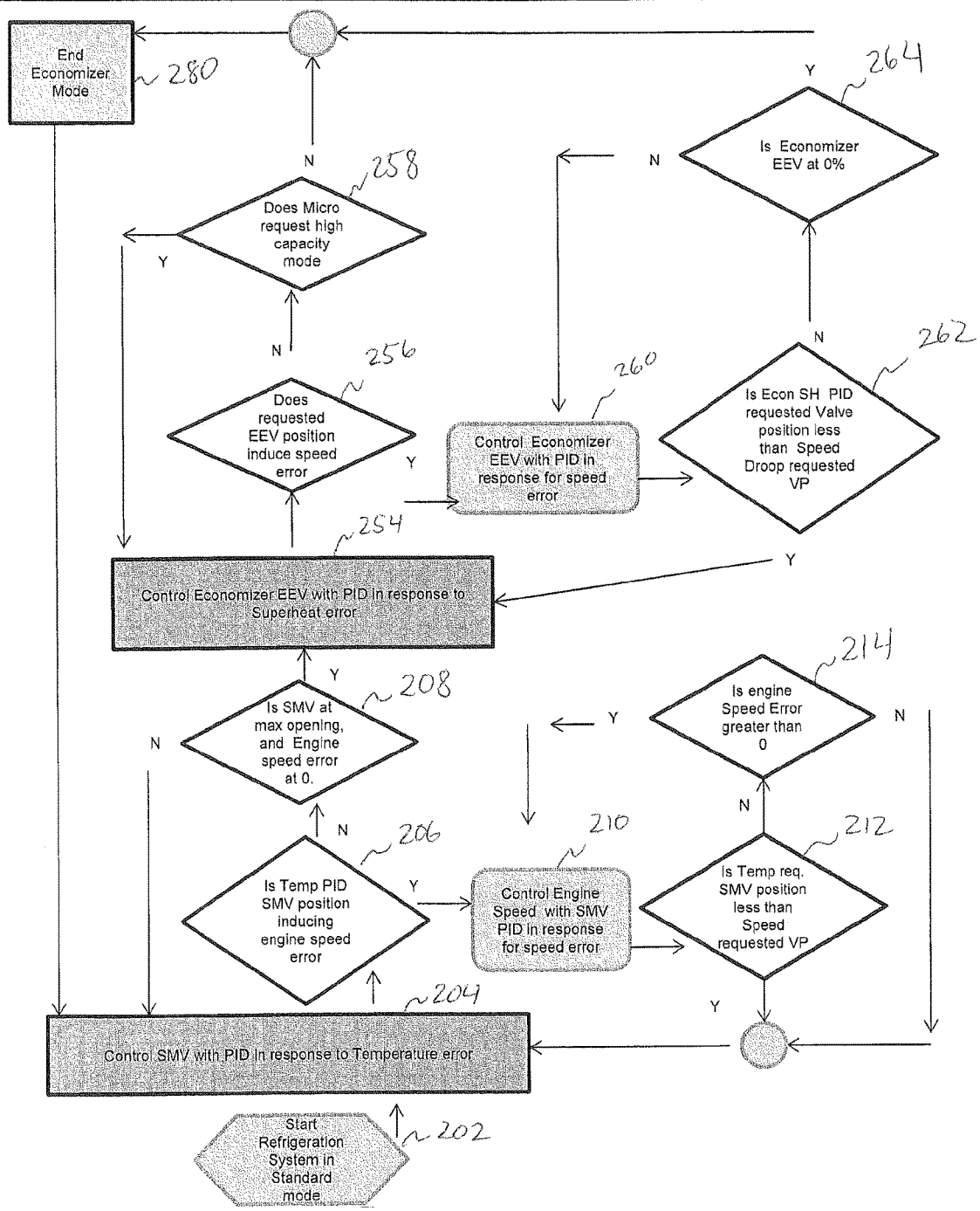
FIGS. 2-3 illustrate exemplary methods in accordance with one or more aspects of this disclosure.

As shown in FIG. 2, steps 212 and 214 may be used to let the speed term decay away before making a switch back to temperature error control. For example, in step 212, if the temperature requested SMV position is less than the speed requested position, flow may proceed from step 212 to step 204. Otherwise, flow may proceed from step 212 to step 214, where a determination may be made whether the engine speed error is greater than zero. If the engine speed error is greater than zero, flow may proceed from step 214 to step 210. Otherwise, if the engine speed error is not greater than zero, flow may proceed from step 214 to step 204. Steps 212 and 214 may be used to provide for a de-integration time to allow the speed error to get back to zero.

Step 254 may be indicative of one or more actions taken in response to an error, such as superheat error. From step 254, flow may proceed to step 256.

In step 256, a determination may be made whether a position of EEV 20 induces a speed error. If not, flow may proceed from step 256 to step 258. On the other hand, if the position of EEV 20 induces a speed error, flow may proceed from step 256 to step 260.

In step 258, a determination may be made whether a high capacity mode is requested. If so, flow may proceed from step 258 to step 254. As part of step 258, a position of EEV 20 may be incremented. On the other hand, if a high capacity mode is not requested, flow may proceed from step 258 to step 280.

Step 260 may be indicative of one or more actions taken in response to an error, such as a speed error detected in connection with step 256. From step 260, flow may proceed to step 262.

In step 262, a determination may be made whether a valve position (e.g., a position associated with EEV 20) is less than a corresponding requested speed droop. If so, flow may proceed from step 262 to step 254. If not, flow may proceed from step 262 to step 264.

In step 264, a determination may be made whether EEV 20 is at a value of 0% (e.g., whether EEV is closed). If so, flow may proceed from step 264 to step 280. If not, flow may proceed from step 264 to step 260. As part of the flow from step 264 to step 260, a value of EEV 20 may be decremented (e.g., EEV 20 may be closed further).

Step 280 may be indicative of an end to an economizer or dual stage operation. In some embodiments, flow may proceed from step 280 to step 204, which may represent the beginning of another iteration of the method of FIG. 2.

Thus, as described above, the flow of FIG. 2 may be viewed as being serial in nature in terms of the operation of the valves. In other words, SMV valve 18 may be maximally opened before the EEV valve 20 is opened. This may result in a relatively smooth power profile, which would help to reduce spikes in terms of load on engine 30.

In some embodiments, the first stage and the second stage compression cycles may be operated in a parallel manner or fashion. Such a parallel operation is exemplified in the method of FIG. 3. For ease of illustration, the method is described in connection with system 10 of FIG. 1A described above. The method shown in FIG. 3 may be adapted to accommodate different systems or architectures.

In step 302, refrigeration unit 12 may be started in a standard mode. For example, SMV 18 may be at least partially open and EEV 20 may be closed to start. The standard mode of step 302 may entail any combination of positions or states for SMV 18 and/or EEV 20. From step 302, flow may proceed to step 304.

Step 304 may be indicative of one or more actions taken in response to an error, such as a temperature error detected by an SMV proportional-integral-derivative (PID) controller. From step 304, flow may proceed to step 306.

In step 306, a determination may be made whether the SMV position is inducing an error condition, such as an engine speed error. The test for engine speed error in connection with the SMV position may be based on a comparison of an engine condition (e.g., fuel flow or RPM (droop)) with a threshold value. If the SMV position is inducing engine speed error, then flow may proceed from step 306 to step 310. If the SMV position is not inducing engine speed error, then flow may proceed from step 306 to step 308.

In step 308, a determination may be made whether a high capacity mode is requested. In some embodiments, a high capacity mode may entail at least partially opening EEV 20. Opening EEV 20 may help to transfer more of engine 30's power to refrigeration unit 12. If a high capacity mode is requested, flow may proceed from step 308 to step 354. If a high capacity mode is not requested, flow may proceed from step 308 to step 304.

In some embodiments, the transition from step 308 to step 354 may also be conditioned on determining that SMV 18 is fully open. In those embodiments, if SMV 18 is not fully open, flow may proceed from step 308 to step 304.

Step 310 may be indicative of one or more actions taken in response to an error, such as an engine speed error as detected in step 306. From step 310, flow may proceed to step 312.

Figure 3:
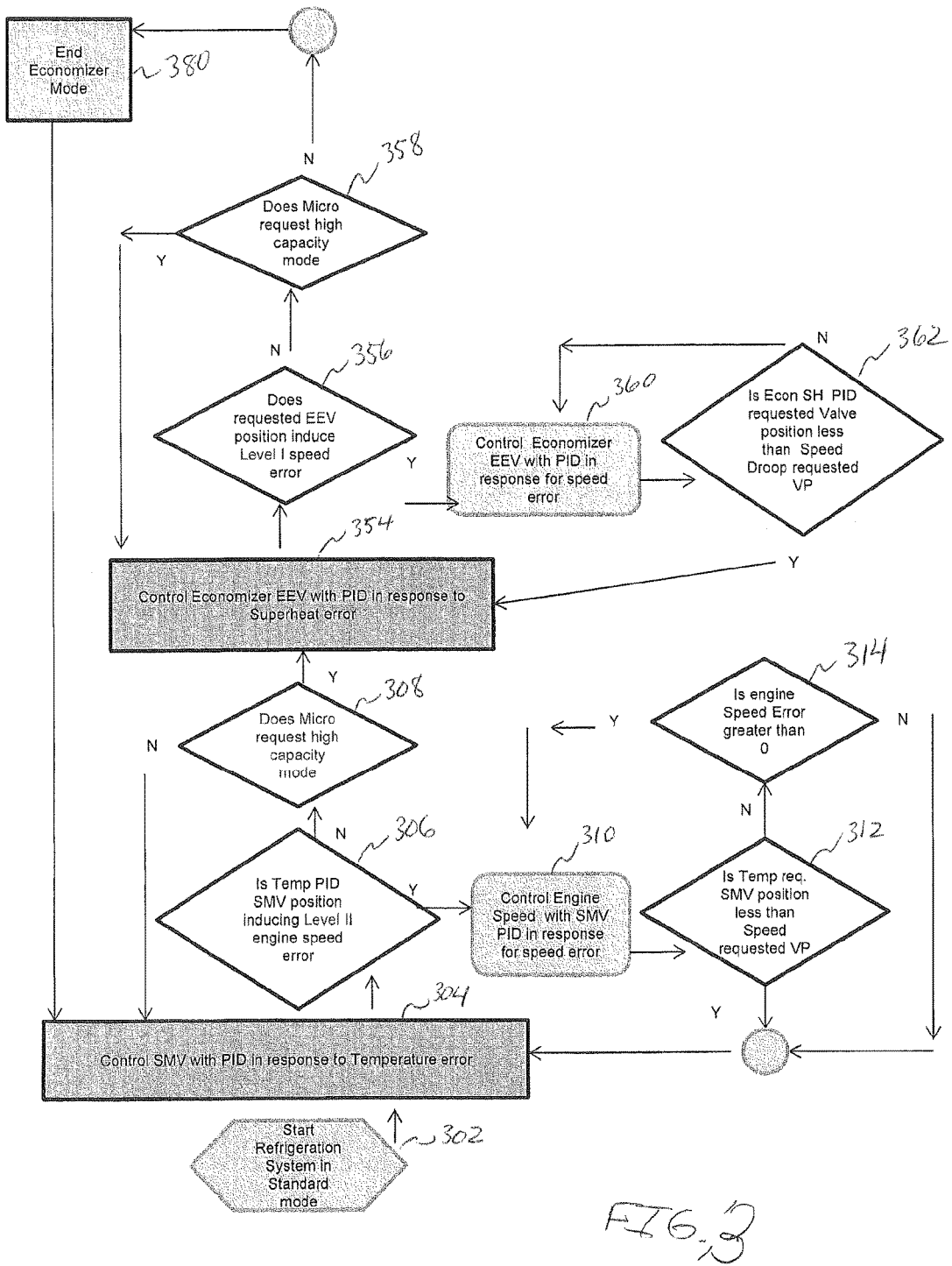

As shown in FIG. 3, steps 312 and 314 may be used to let the speed term decay away before making a switch back to temperature error control. For example, in step 312, if the temperature requested SMV position is less than the speed requested position, flow may proceed from step 312 to step 304. Otherwise, flow may proceed from step 312 to step 314, where a determination may be made whether the engine speed error is greater than zero. If the engine speed error is greater than zero, flow may proceed from step 314 to step 310. Otherwise, if the engine speed error is not greater than zero, flow may proceed from step 314 to step 304. Steps 312 and 314 may be used to provide for a de-integration time to allow the speed error to get back to zero.

Step 354 may be indicative of one or more actions taken in response to an error, such as superheat error. From step 354, flow may proceed to step 356.

In step 356, a determination may be made whether a position of EEV 20 induces a speed error. The test for engine speed error in connection with the EEV position may be based on a comparison of an engine condition (e.g., fuel flow or RPM (droop)) with a threshold value. If not, flow may proceed from step 356 to step 358. On the other hand, if the position of EEV 20 induces a speed error, flow may proceed from step 356 to step 360.

In some embodiments, the threshold value selected to test for error in step 306 may be different from the threshold value selected to test for error in step 356. For example, the threshold value selected to test for error in step 306 may be set such that it allows for a higher degree of (engine) error relative to the threshold value selected to test for error in step 356. In this manner, the SMV 18 may be used as a back-up control valve or mechanism if EEV 20 is unable to control system 10 to the lower degree of error. In some embodiments, at least one of the thresholds may be set at 10 RPM below nominal running speed.

In step 358, a determination may be made whether a high capacity mode is requested. If so, flow may proceed from step 358 to step 354. As part of step 358, a position of EEV 20 may be incremented. On the other hand, if a high capacity mode is not requested, flow may proceed from step 358 to step 380.

Step 360 may be indicative of one or more actions taken in response to an error, such as a speed error detected in connection with step 356. From step 360, flow may proceed to step 362.

In step 362, a determination may be made whether a valve position (e.g., a position associated with EEV 20) is less than a corresponding requested speed droop. If so, flow may proceed from step 362 to step 354. If not, flow may proceed from step 362 to step 360.

In some embodiments, as part of step 362, a determination may be made whether EEV 20 is at a value of 0% (e.g., whether EEV is closed). If so, flow may proceed from step 362 to step 380 (not shown). If EEV 20 is not at 0%, flow may proceed from step 362 to step 360 as described above. As part of the flow from step 362 to step 360, a value of EEV 20 may be decremented (e.g., EEV 20 may be closed further).

Step 380 may be indicative of an end to an economizer or dual stage operation. In some embodiments, flow may proceed from step 380 to step 304, which may represent the beginning of another iteration of the method of FIG. 3.

Thus, as described above, the flow of FIG. 3 may be viewed as being parallel in nature in terms of the operation of the valves. For example, by using different thresholds in connection with steps 306 and 356, a fine-tuning may be achieved to fully transfer engine 30's available power to refrigeration unit 12, while avoiding imposing excessive load on engine 30.

In some embodiments, serial and parallel operations may be combined with one another. For example, two valves may be arranged in parallel with one another, and the parallel valve combination may be coupled to at least one additional valve in series.

In some embodiments, filtering may be performed by one or more devices (e.g., one or more controllers 32 and 34) in order to avoid unnecessarily opening or closing a valve. For example, hysteresis may be used to minimize the number of times a valve position is changed within a given time period. Such techniques may help to promote the life span of a valve.

In some embodiments, capacity and power limitations may be managed by running one or more cycles or stages at peak capability in response to true engine (over)load by coupling engine performance (e.g., speed) with refrigeration power. The techniques described herein may be used to adapt to engine degradation over time. For example, engine performance may degrade in response to a dirty air filter, or at an end of the operational life of the engine.

As described, aspects of the disclosure may provide for a closed loop capacity and power management scheme for a multi stage transport refrigeration system. For example, in some embodiments refrigeration power may be coupled (e.g., directly coupled) to managed engine speed when at peak engine horsepower levels. Such coupling may help to ensure that 100% of engine power is utilized (less any loss in the system). In some embodiments, the multiple stages may be arranged in a serial or a parallel manner. In this manner: (1) as smooth a power profile as is possible may be obtained, (2) load imposed on the engine may be set in accordance with one or more configurable thresholds, allowing for customization or tailoring based on a given application, and (3) back-up or redundant control mechanisms may be used by simply selecting appropriate thresholds.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations. Aspects of the disclosure may be directed to one or more systems, apparatuses, and methods.

Aspects of the disclosure may be tied to particular machines. For example, in some embodiments a unit may include one or more components that may be used to selectively alter a load imposed on a power source. In some embodiments, one or more controllers may alter a position or state associated with the one or more components to achieve the selective altering of the load. For example, the extent or degree to which a valve is open (or closed) may serve to control the flow of refrigerant to a compressor, which may serve to control the load imposed on an engine. One or more of the controllers may measure or monitor engine performance and send a control signal to a valve based at least in part on the measurement.

Aspects of the disclosure may transform an article into a different state or thing. For example, a condition (e.g., an error condition) associated with a power source (e.g., an engine) may be transformed into a position associated with a component (e.g., a valve). In turn, the component's position may be transformed into a change in the power source's load.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system comprising:
a transport refrigeration unit comprising two valves;
an engine; and
at least one controller,
wherein the at least one controller is configured to measure a parameter associated with the engine, and
wherein the at least one controller is configured to dynamically select a position for each of the valves based at least in part on the measured parameter so as to maximize a power provided by the engine to the transport refrigeration unit without exceeding a capacity of the engine, and
wherein the valves are arranged in a plurality of stages;
wherein a first of the valves is a suction modulation valve, and wherein a second of the valves is an economizer expansion valve associated with an economizer circuit.

2. A system comprising:
a transport refrigeration unit comprising two valves;
an engine; and
at least one controller,
wherein the at least one controller is configured to measure a parameter associated with the engine, and
wherein the at least one controller is configured to dynamically select a position for each of the valves based at least in part on the measured parameter so as to maximize a power provided by the engine to the transport refrigeration unit without exceeding a capacity of the engine, and
wherein the valves are arranged in a plurality of stages;
wherein the valves are operated in a serial manner with respect to one another, and wherein the at least one controller is configured to:
keep a first of the valves closed until a second of the valves is fully open, and
keep the second of the valves fully open until the position associated with the first of the valves changes from partially open to closed.

3. A system comprising:
a transport refrigeration unit comprising two valves;
an engine; and
at least one controller,
wherein the at least one controller is configured to measure a parameter associated with the engine, and
wherein the at least one controller is configured to dynamically select a position for each of the valves based at least in part on the measured parameter so as to maximize a power provided by the engine to the transport refrigeration unit without exceeding a capacity of the engine, and
wherein the valves are arranged in a plurality of stages;
wherein the valves are operated in a parallel manner with respect to one another, and wherein the position for a first of the two valves is based on a first threshold associated with an overload condition of the engine, and wherein the position for a second of the two valves is based on a second threshold associated with the overload condition of the engine.

4. The system of claim 1, wherein the two valves are subjected to different pressures, and wherein the first of the plurality of stages dictates an evaporator mass flow, and wherein a second of the plurality of stages dictates a subcooling potential to an evaporator.

5. The system of claim 1, wherein the measured parameter comprises at least one of: speed of the engine, a position of a mechanical fuel rack associated with the engine, and a temperature of the engine.

6. The system of claim 1, wherein the at least one controller is configured to apply hysteresis to the selection of the position for at least one of the valves.

7. The system of claim 2, wherein the first of the valves is a suction modulation valve, and wherein the second of the valves is an economizer expansion valve associated with an economizer circuit.

8. The system of claim 3, wherein the first of the valves is a suction modulation valve, and wherein the second of the valves is an economizer expansion valve associated with an economizer circuit.

* * * * *